United States Patent [19]
Suzuki et al.

[11] Patent Number: 6,089,910
[45] Date of Patent: Jul. 18, 2000

[54] CONNECTION STRUCTURE OF MOVABLE CONNECTOR

[75] Inventors: Takahiko Suzuki; Hiroshi Watanabe, both of Shizuoka, Japan

[73] Assignee: Yazaki Corporation, Tokyo, Japan

[21] Appl. No.: 09/231,488

[22] Filed: Jan. 14, 1999

[30] Foreign Application Priority Data

Feb. 18, 1998  [JP]  Japan ................................. 10-035825

[51] Int. Cl.$^7$ .................................................. H01R 13/52
[52] U.S. Cl. .......................................... 439/559; 439/281
[58] Field of Search ..................................... 439/559, 556, 439/281, 282, 560, 562, 565, 567, 587, 278

[56] References Cited

U.S. PATENT DOCUMENTS

| 3,444,313 | 5/1969 | Goodchile, Jr. ......................... 439/559 |
| 3,611,256 | 10/1971 | Abair ....................................... 439/559 |
| 4,836,802 | 6/1989 | Phillips ................................... 439/281 |
| 5,775,944 | 7/1998 | Flask et al. ............................. 439/556 |

FOREIGN PATENT DOCUMENTS

| 1665408 | 3/1971 | Germany . |
| 9-45433 | 2/1997 | Japan . |

Primary Examiner—Renee Luebke
Assistant Examiner—T. C. Patel
Attorney, Agent, or Firm—Armstrong, Westerman, Hattori, McLeland & Naughton

[57] ABSTRACT

A connection structure of a movable connector includes: a movable connector having a housing body; a panel wall having a panel hole in which the movable connector is inserted; a complementary connector to be coupled with the movable connector; and an elastic water-proofing packing which is fit over an outer periphery of the housing body. The elastic packing has a peripheral groove in which an inner peripheral edge of the panel wall abutting the panel hole is fit. In this configuration, the connection structure for a movable connector can be used in the place containing water.

4 Claims, 5 Drawing Sheets

CONNECTION STRUCTURE OF MOVABLE CONNECTOR

BACKGROUND OF THE INVENTION

1. Field of the Invention

The present invention relates to a connection structure of a movable connector.

2. Description of the Related Art

As shown in FIG. 5, an attachment structure for a movable connector 63 has been proposed which is to be fit in a panel hole 62 of a panel wall 61 (JP-A-9-45433).

The movable connector 63 is so designed that a pair of engagement arms 65 are uprighted from the outer surface of a housing body 64, a pair of protection nbs 66 on both sides of each of the engagement arms 65 are projected, and a pair of stoppers 67 are provided on both sides of the pair of protection ribs 66. In a fitting operation, the movable connector 63, after having been attached to the panel hole 62 by engagement between the engagement arms 66 and panel hole 62, is coupled with a complementary connector 68.

However, as shown in FIG. 6, even after the fitting the engagement arms 65 are exposed to air so that the movable connector 63 and the complementary connector 68 in their coupled state cannot be arranged at the place which is splashed with water or contains water.

SUMMARY OF THE INVENTION

An object of the present invention is to provide a connection structure of a movable connector which can be used at the place which contains water.

In order to attain the above object, in accordance with the present invention, there is provided a connection structure of a movable connector comprising: a movable connector having a housing body; a panel wall having a panel hole in which the movable connector is inserted; a complementary connector to be coupled with said movable connector; and an elastic water-proofing packing which is fit over an outer periphery of said housing body. Preferably, the elastic water-proofing packing has a peripheral groove in which an inner peripheral edge of said panel wall abutting said panel hole is fit.

In this configuration, since the movement of the movable connector can be made by extension/contraction of the water-proofing packing, the movable connector can be prevented from being moved excessively and detached from the panel hole.

Preferably, the elastic water-proofing packing has an inner sealing portion extending toward the complementary connector in a coupling direction between the movable connector and said complementary connector and overlaying the housing body and the complementary connector has a covering portion into which the inner sealing portion is to be fit. Such a configuration, after coupling, permits both connectors to be located at the place containing water. For this reason, the movable connector or complementary connector can be provided in the place containing water, the auxiliary machine extending between the interior of a room sectioned by the panel wall and the exterior the room.

Preferably, one of side walls constituting the peripheral groove has a protrusive strip to be kept in intimate contact with the panel wall. In this configuration, after the water-proofing packing is inserted in the panel hole, the protrusive strip is kept in intimate contact with the panel wall. This enhances the water-proofing property between the water-proofing packing and the panel wall.

Preferably, the covering portion has a taper formed on its side of the movable connector, and the inner sealing portion has a protrusive strip formed in a direction orthogonal to the coupling direction and to be engaged with an inner face of the covering portion. In this configuration, when the movable connector and complementary connector are coupled with each other, the protrusive strip can be easily entered into the covering portion. This can reduce the force required to couple the movable connector and complementary connector to each other. In addition, after the coupling, since the protrusive strip and the inner face of the covering portion are brought into intimate contact with each other, water-proofing property between the inner sealing portion and the covering portion can be improved.

The above and other objects and features of the present invention will become apparent from the following description taken in conjunction with the accompanying drawings.

DESCRIPTION OF THE PREFERRED EMBODIMENTS

Figure 1:
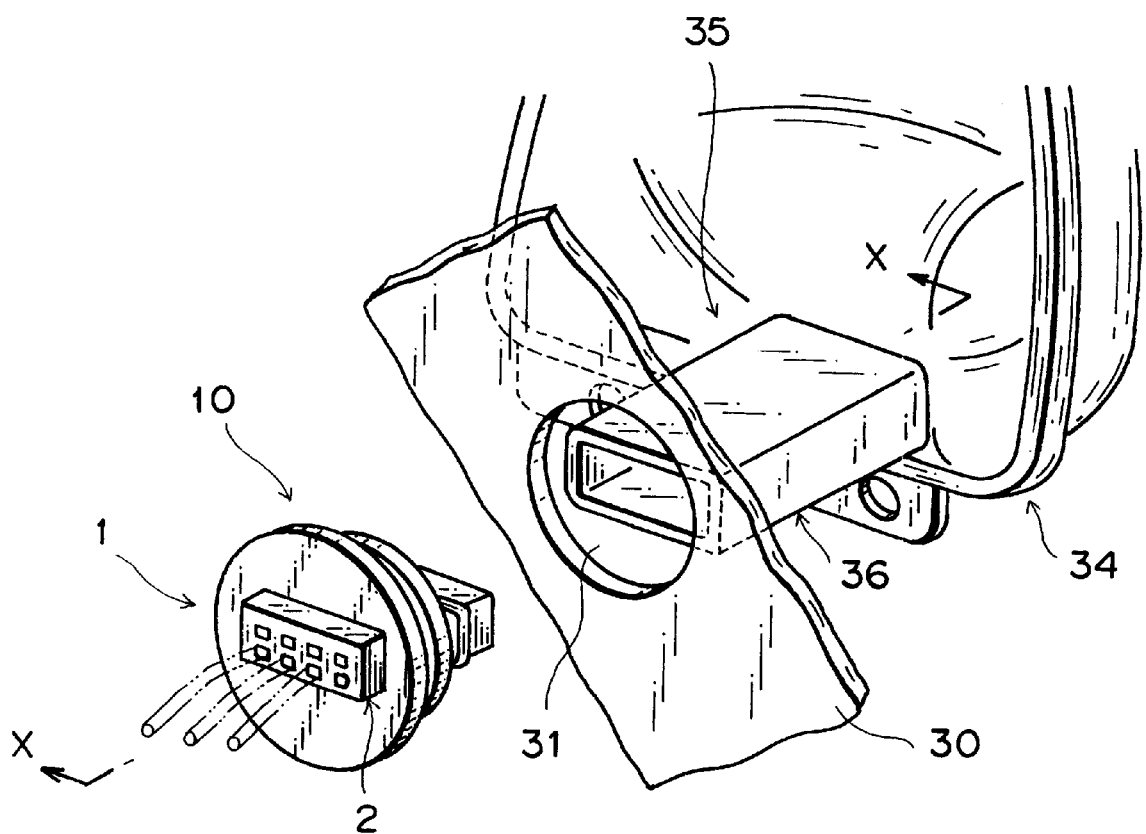
FIG. 1 is an entire perspective view showing an embodiment of the connection structure of a movable connector according to the present invention.

Now referring to the drawings, an explanation will be given of an embodiment of the present invention.

FIGS. 1–4 are views showing an embodiment of the connection structure of a movable connector according to the present invention.

Figure 2:
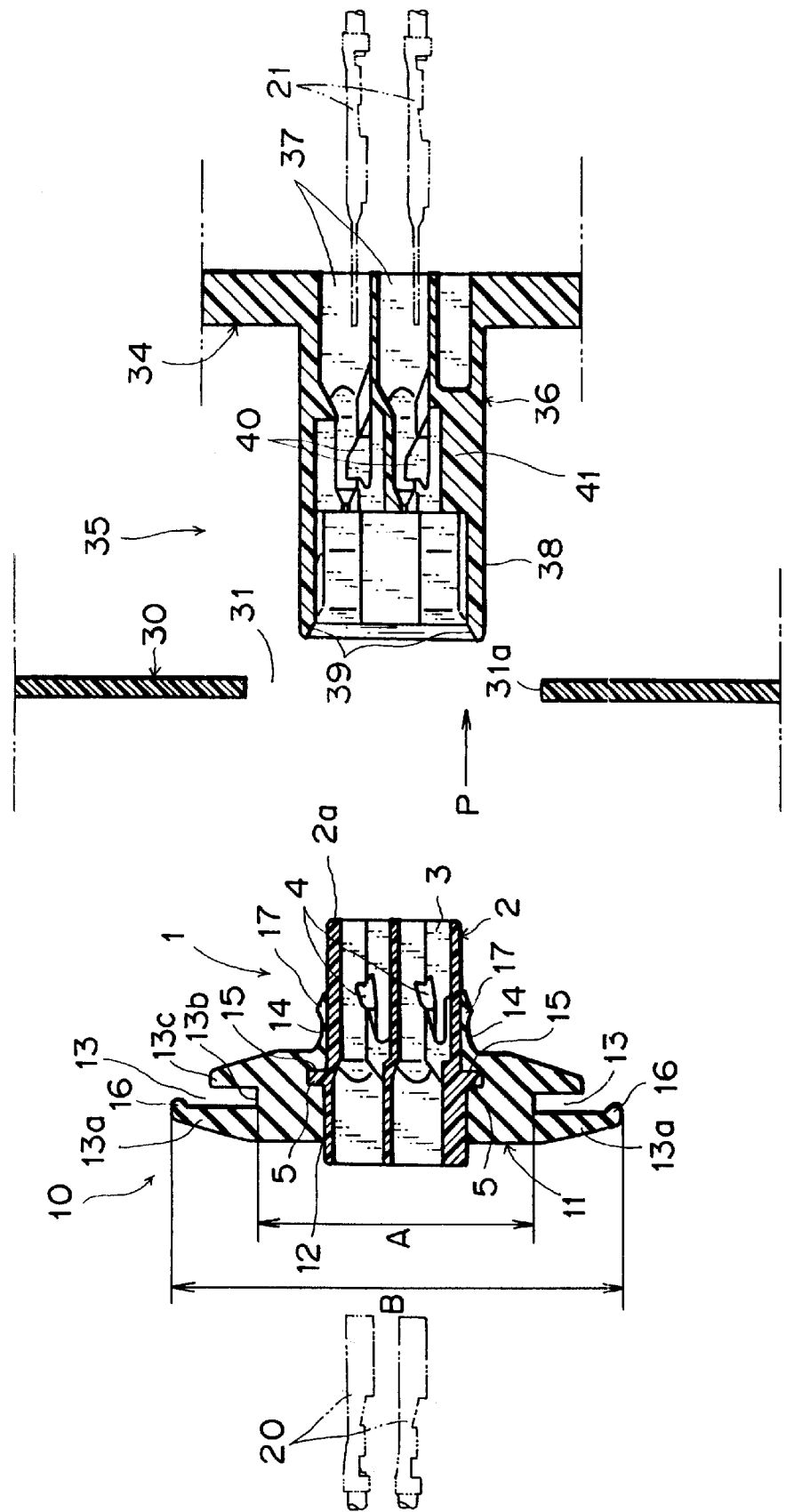
FIG. 2 is a sectional view taken in line X—X in FIG. 1.

As seen from FIGS. 1 and 2, the connection structure of a movable connector 1 is so designed that a water-proofing packing 10 attached to the outer periphery of a housing body 2 of a movable connector 1 is fit in a panel hole 31 of a panel wall 30 and the movable connector 1, which is movable by extension/contraction of the water-proofing packing 10, is coupled with a complementary connector 35.

The movable connector 1 is composed of a housing body 2 of insulating synthetic resin, a plurality of terminal chambers 3 passing through the housing body 1, a plurality of engagement lances 4 each protruding from the internal face of each of the terminal chambers 3 and positioning strip 5 protruding from the outer surface of the housing body 2.

The water-proofing packing 10 made of rubber has a packing body 11 having a passing-through hole 12, a ring-shaped groove 13 formed on the outer periphery thereof, and inner sealing portion 14 extending in a fitting direction (P-direction) from the vicinity of the passing-through hole 12. An engagement groove 15 is formed on the inner face of the passing-through hole 12 so as to be engaged with the positioning strip 5. The ring-shaped groove 13 is fit over the inner peripheral edge of the panel wall abutting the panel hole 31. The one side wall 13a of the ring-shaped groove 13 has a sealing strip 16 protruding from its tip towards the panel wall 30. The outer surface of the housing body 2 is covered with the inner sealing portion 14. An engagement strip 17, in a direction orthogonal to the coupling direction (P-direction), is formed on the outer periphery of the inner sealing portion 14.

The complementary connector 35 is composed of a housing body 36 provided on an auxiliary machine 34, a plurality of terminal chambers 37 passing through the housing body 36 and a covering portion 38 swelling toward the movable connector 1 from the housing body 36. On the side of the movable connector 1 of the covering portion 38, a taper 39 is formed to introduce the movable connector 1 into the covering portion 38 smoothly. On the inner face of each of the terminal chambers 37, a securing lance 40 is formed to secure a terminal 21, and a stopper wall 41 is formed to prevent excessive progress of the movable connector 1.

Where the water-proofing packing 10 fit over the movable connector 1 is fit in the panel hole 31, the moving quantity of the movable connector 1 depends on the extension/contraction quantity of the elastic portion 18 of the water-proofing packing 10. Specifically, the extension/contraction of the elastic portion 18 depends on the difference between the diameter A across the bottom 13b of the groove 13 and the diameter B across the free end of the one side wall 13a of the groove 13.

An explanation will be given of the process in which the waterproofing packing 10 is fit over the movable connector 1 and is fit in the panel hole 31 and the movable connector 1 is coupled with the complementary connector 35.

As seen from FIG. 2, the terminals 20 are inserted into the terminal chambers 3 to provide a movable connector 1. The water-proofing packing 10 is fit over the outer face of the housing body 2 of the movable connector 1. At this time, the positioning strip 5 is engaged with the engagement groove 15. Thus, the packing body 11 is put on the rear half of the housing body 2 and the inner sealing portion 14 is put on the front half of the housing body 2.

Figure 3:
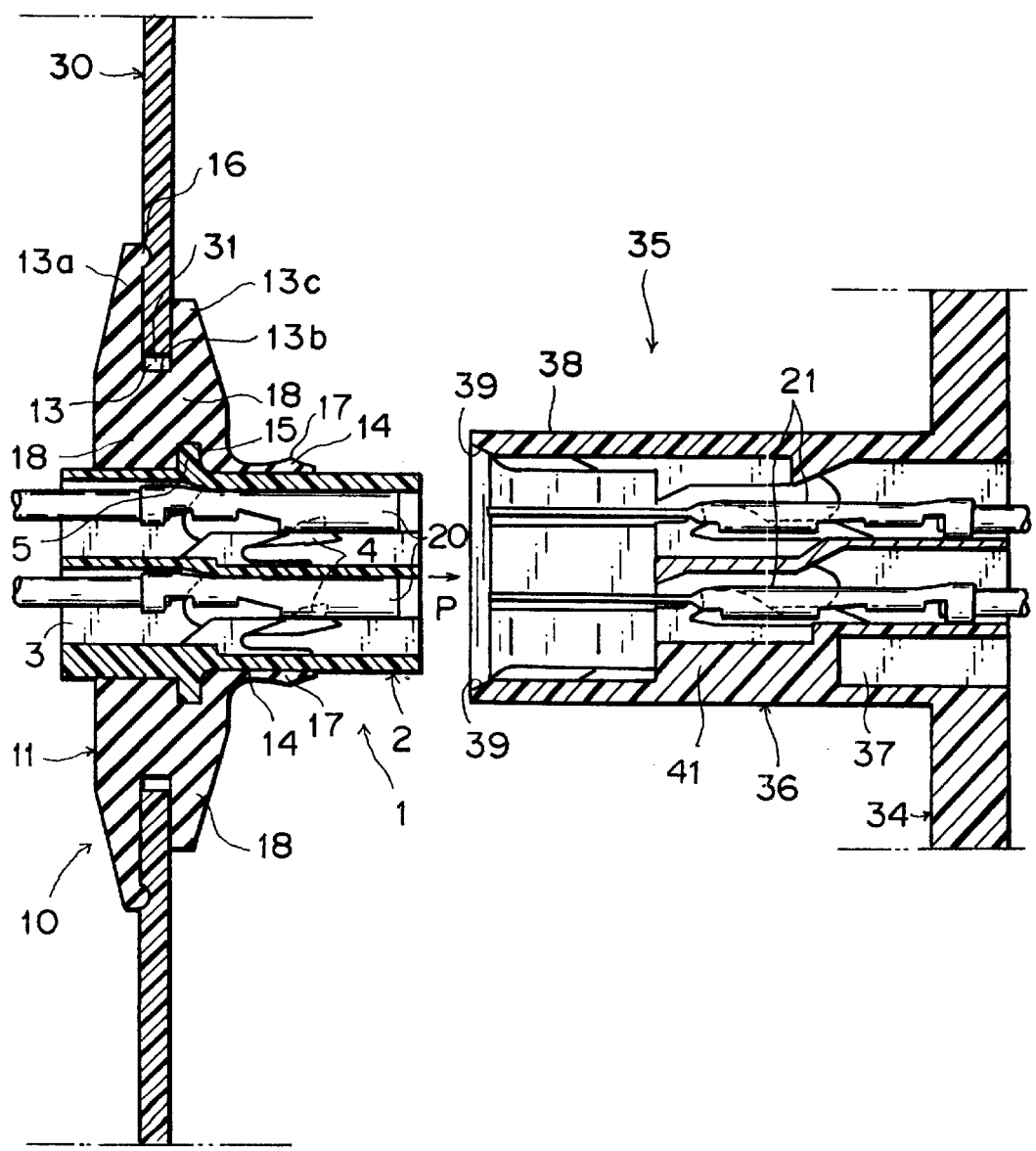
FIG. 3 is a sectional view of the state where the water-proofing packing in FIG. 2 is fit in a panel hole.

In order to fit the movable connector 1 into the panel hole 31, the movable connector 1 is moved in the coupling direction (P direction). As shown in FIG. 3, when the water-proofing packing 10 is brought into contact with the panel wall 30, it is further pushed in the same direction (P direction). Then, the opposite groove walls 13a and 13c of the ring-shaped groove 13 are pressed on the panel wall 30 by interaction therebetween and warps in a direction opposite to the coupling direction (P direction). When the other groove side wall 13c of the ring-shaped groove 13 passes the panel wall 30, the warp of the groove side wall 13c is restored. As a result, the inner peripheral edge 31a of the panel wall 30 abutting the panel hole 31 is fit in the ring-shaped groove 13. At this time, the sealing protrusive strip 16 is brought into intimate contact with the panel wall 30. This implements the water-proofing of the inside and outside of the panel wall 30.

As shown in FIG. 2, the complementary connector 35 is mounted in the auxiliary machine 34 so that it is oriented toward the movable connector 1. As shown in FIG. 3, the complementary connector 35 is moved toward the movable connector 1 (in the direction opposite to the direction P) until the taper 39 of the covering portion 38 is brought into contact with the tip 2a of the movable connector 1. In response to the movement of the complementary connector 35, the movable connector 1 is moved. The movable connector 1 can be moved because the water-proofing packing 10 made of rubber has elasticity. The elasticity of the water-proofing packing 10 restricts extreme movement of the movable connector, and hence the movable connector 1 is prevented from being detached from the panel hole 31.

Figure 4:
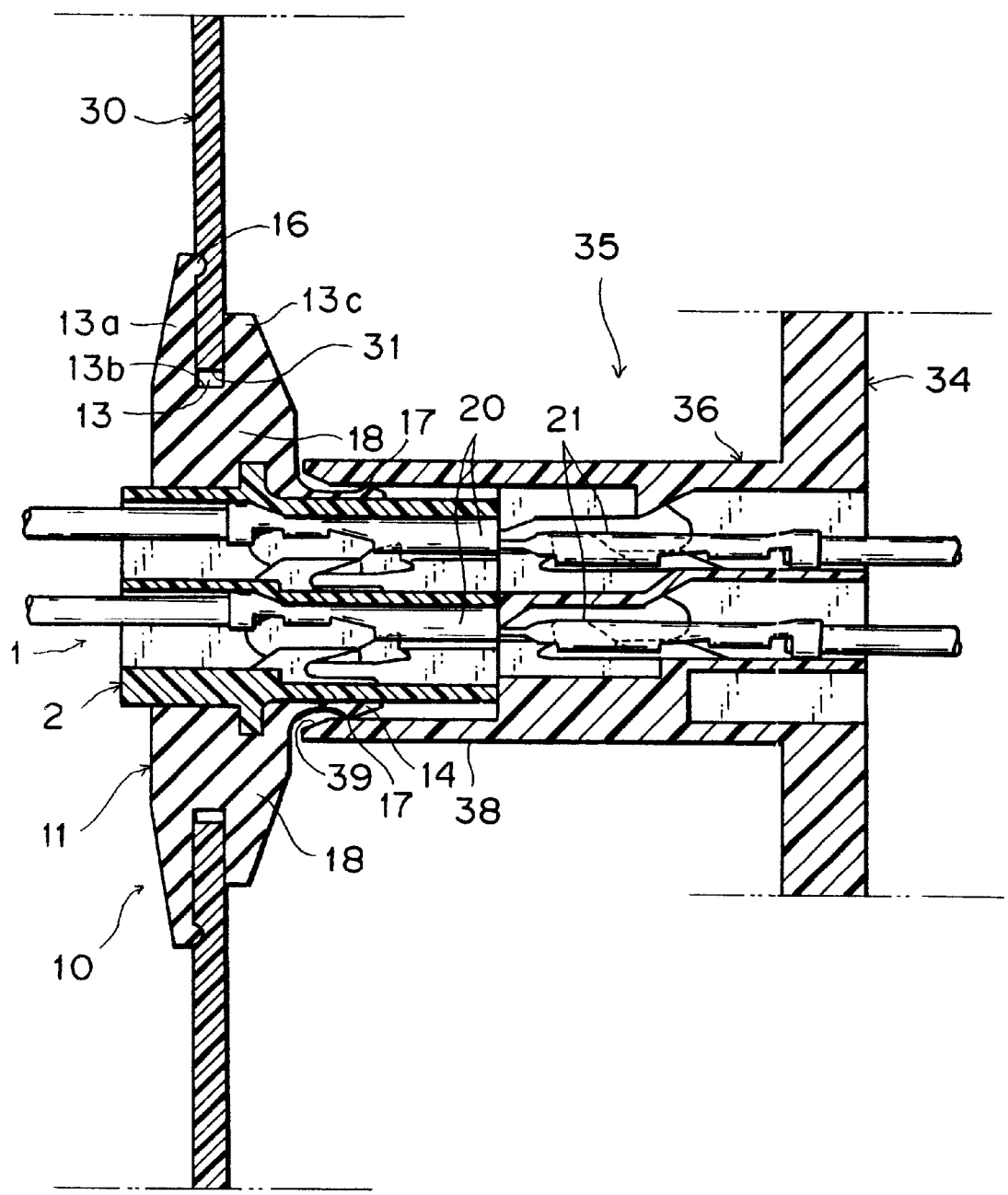
FIG. 4 is a sectional view where the movable connector in FIG. 3 has been coupled with a supplemental connector.
Figure 5:
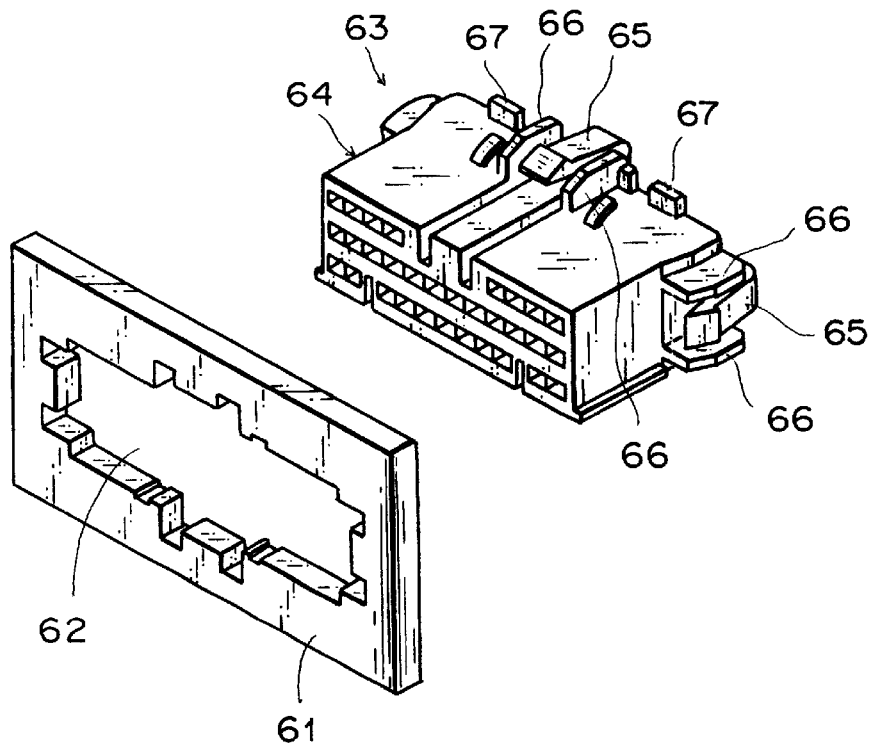
FIG. 5 is a perspective view of a conventional movable connector.
Figure 6:
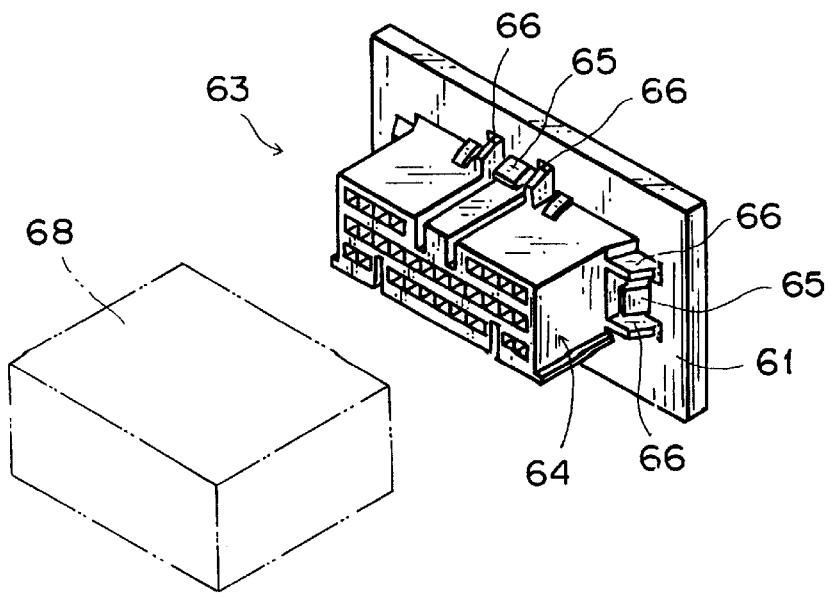
FIG. 6 is a perspective view showing the state where the movable connector shown in FIG. 5 has been fit in a panel wall.

Accordingly, as shown in FIG. 4, the movable connector 1 is coupled with the complementary connector 35. In this case, the inner sealing portion 14 of the water-proofing packing 10 is housed within the covering portion 38. Therefore, the inner sealing portion 14 is sandwiched between and brought into intimate contact with the outer surface of the housing body 2 of the movable connector 1 and the inner surface of the covering portion 38. The water-proofing at the area where the movable connector 1 and complementary connector 35 are coupled with each other.

After the movable connector 1 and the complementary connector 35 are coupled with each other, both connectors 1 and 35 are secured to the auxiliary machine 34 using an engagement means.

What is claimed is:

1. A connection structure of a movable connector comprising:

a movable connector having an insulating housing body;

a panel wall having a panel hole therein in which said movable connector is inserted;

a complementary connector to be coupled with said movable connector; and an elastic water-proofing packing which is fit over an outer periphery of said housing body, wherein said elastic water-proofing packing has an inner sealing portion extending toward said complementary connector in a coupling direction between said movable connector and said complementary connector and overlaying said housing body and said complementary connector has a covering portion into which said inner sealing portion is to be fit; said covering portion has a taper formed on its side of said movable connector; and said inner sealing portion has a protrusive strip formed in a direction orthogonal to said coupling direction and to be engaged with an inner face of said covering portion.

2. A connection structure of a movable connector according to claim 1, wherein said elastic water-proofing packing has a peripheral groove in which an inner peripheral edge of said panel wall is fit.

3. A connection structure of a movable connector according to claim 2, wherein one of side walls constituting said peripheral groove has a protrusive strip to be kept in intimate contact with said panel wall.

4. A connection structure of a movable connector according to claim 1, wherein said movable connector has a positioning protrusive strip formed on its outer periphery and said elastic water-proofing packing has a groove formed in its inner periphery to be engaged with said positioning protrusive strip.

* * * * *